United States Patent [19]

Vareille et al.

[11] Patent Number: 5,285,252
[45] Date of Patent: Feb. 8, 1994

[54] OPTICAL METHOD AND OPTICAL DEVICE FOR DISTANCE MEASUREMENT AND THEIR APPLICATION TO THE RELATIVE POSITIONING OF PARTS

[75] Inventors: Aime Vareille, Echirolles; Andre Schiltz, Saint-Ismier; Jean C. Hauüy, Crolles, all of France

[73] Assignee: France Telecom, France

[21] Appl. No.: 997,608

[22] Filed: Dec. 28, 1992

[30] Foreign Application Priority Data

Dec. 27, 1991 [FR] France ................. 91 16260

[51] Int. Cl.⁵ .......................... G01C 3/08; G01B 9/02
[52] U.S. Cl. ........................................ 356/4; 356/4.5; 356/349
[58] Field of Search ............... 356/349, 4, 4.5

[56] References Cited

U.S. PATENT DOCUMENTS 4,005,936 2/1977 Redman et al. ................. 356/5
4,355,899 10/1982 Nussmeir ...................... 356/349
4,695,162 9/1987 Itonaga et al. ................. 356/369

FOREIGN PATENT DOCUMENTS 045246 10/1991 European Pat. Off.
1579550 8/1969 France.
2100419 3/1972 France.
2184829 12/1973 France.

Primary Examiner—Stephen C. Buczinski
Attorney, Agent, or Firm—Arnold, White & Durkee

[57] ABSTRACT

An optical method and optical device for distance measurement, comprising the steps of emitting an incident light beam (13) comprising at least two waves of differing wavelengths ($\lambda 1$ and $\lambda 2$); separating this beam into a reference beam (15) and a measurement beam (17) which are reflected on, respectively, a reference reflector (16) and a zone (18) of a part (19), of which it is desired to measure the position in the direction of the measurement beam and recombine into a resultant beam (20), in which said waves exhibit conditions of polarization, the components of which rotate when the optical path of the aforementioned measurement beam varies and which determine, in the direction of the measurement beam, adjacent ranges at the ends of each one of which the angular positions of two corresponding components of these conditions of polarization are identical; determining, in the resultant beam (20), the angular positions ($\alpha 1$ and $\alpha 2$) of two corresponding components of said conditions of polarization of said waves; and computing, as a function of said angular positions, the distance separating the aforementioned zone of said part from a reference position, preferably the image of the reference reflector.

Their application to the positioning of parts, especially of a chip inserted in a substrate.

24 Claims, 3 Drawing Sheets

OPTICAL METHOD AND OPTICAL DEVICE FOR DISTANCE MEASUREMENT AND THEIR APPLICATION TO THE RELATIVE POSITIONING OF PARTS

The present invention relates to an optical method and device for distance measurement and their application to the positioning of parts.

In order to measure distances, and more specifically variations of distance, use has for a long time been made of interferometers, for example of the MICHELSON type, shown in FIG. 1 of the accompanying drawing, in which interferometers a monochromatic incident beam 1 is separated by a separator plate 2 into a reference beam 3 and a measurement beam 4 which are directed back towards this separator plate 2 by reflectors, formed for example by mirrors 5 and 6, in order to be recombined into a resultant beam 7.

If the optical paths traversed by the reference beam 3 and the measurement beam 4 are different, the electromagnetic waves of these beams are phase-shifted and it is possible to observe on an observation plane 8 placed in the resultant beam 7, interference fringes 9 and 10 which are alternately bright and dark, as illustrated by FIG. 2 of the accompanying drawing. If one of the mirrors is displaced, for example the mirror 5, and if a slit is placed in the plane 8, dark and light fringes will be seen to move past through this slit, the passage of two dark fringes corresponding to a displacement of the mirror 5 by one half wavelength.

Thus, by counting the fringes, it is possible to determine the displacement of the mirror 5, it being possible for interpolations to be made between two fringes.

In the equipments which are marketed and which make use of the above principle of interferometers, the accuracy is in the order of one 48th of the wavelength of the incident wave utilized. Thus, if the light source emits an incident beam in the red, of 600 nm, the accuracy which may be obtained using a quality equipment is in the order of 0.3 nm.

In order to increase the accuracy of interferometers, it has been proposed to modify the mutual polarization of the reference beam and of the measurement beam in order that their waves should be polarized orthogonally to one another when they are recombined. In these circumstances, the resultant beam no longer gives an interference pattern, but is formed of a wave of polarization which is dependent upon the phase shift between the reference beam and the measurement beam. It is then possible to undertake the analysis of this phase shift due to a difference in optical paths between the reference beam and the measurement beam, by an analysis of polarization, using equipments which are known in the field of polarimetry, for example rotating-plate ellipsometers or other polarization analyzers. As this measuring equipment may achieve an accuracy in the order of one hundredth of a degree, the accuracy which may be achieved by measurement of phase shift may be in the order of one hundredth of a nanometer.

Although this measurement technique permits the measurement of displacements of one of the mirrors with accuracy, it leaves a subsistent uncertainty with regard to the position of this mirror, having regard to the uncertainty which is inherent in the measurement of an angle which is undertaken modulo $2\pi$. For one and the same result of the phase shift angle measurement, the mirror may in fact be at a distance d, but also at a distance d, $(+)$ or $(-)$ k $\lambda/2$, $\lambda$ being the wavelength utilized and k being a natural integer.

The present invention aims at proposing another technique for distance measurement and the applications which stem therefrom.

The subject of the present invention is, first of all, an optical method for distance measurement, which comprises the steps of emitting an incident light beam comprising at least two waves of differing wavelengths ($\lambda 1$ and $\lambda 2$); separating this beam into a reference beam and a measurement beam, which are reflected on, respectively, a reference reflector and a zone of a part of which it is desired to measure the position in the direction of the measurement beam; recombining the reflected reference and measurement beams into a resultant beam in which said waves exhibit conditions of polarization, the components of which rotate when the optical path of the aforementioned measurement beam varies and which determine, in the direction of the measurement beam, adjacent ranges at the ends of each one of which the angular positions of two corresponding components of these conditions of polarization are identical; determining, in the resultant beam, the angular positions ($\alpha 1$ and $\alpha 2$) of two corresponding components of said conditions of polarization of said waves; and calculating as a function of said angular positions, the distance separating the aforementioned zone of said part from a reference position.

According to the invention, the method preferably comprises the step of calculating the aforementioned distance d from the image of the reference reflector, by applying the principle of excess fractions to the integers k1 and k2 of the optical path equations using the following formula:

$$\alpha 1.\lambda 1 + 2.k1.\lambda.\lambda 1 = \alpha 2.\lambda 2 + 2.k2.\pi.\lambda 2 = 4.\pi.n.d$$

in which n is the refractive index of the measurement medium, or the following corrected formula:

$$C1 + \alpha 1.\lambda b + 2.k1.\pi.\lambda 1 = C2 + \alpha 2.\lambda 2 + 2.k2.\pi.\lambda 2 = 4.\pi.n.d$$

in which C1 and C2 are the optical path differences associated with the chromatic dispersion of the interferometer at the selected wavelengths $\lambda 1$ and $\lambda 2$.

In a variant, the method preferably comprises the step of emitting the two waves simultaneously. In a variant, it comprises the step of emitting the two waves in succession.

According to the invention, the emitted beam is preferably a polychromatic beam, preferably having an extended line spectrum, from which the two aforementioned waves are extracted.

In a variant of the invention, the aforementioned waves are selected in the incident beam. In a further variant, the aforementioned waves are selected in the resultant beam.

According to the invention, the method preferably comprises the step of polarizing the incident beam.

According to the invention, the method preferably comprises the step of polarizing the reference and measurement beams orthogonally to one another.

According to the invention, the method comprises the step of dividing the resultant beam into two analysis beams which comprise respectively the waves of wavelengths $\lambda 1$ and $\lambda 2$.

According to the invention, the aforementioned angular positions of the conditions of polarization of the aforementioned waves may advantageously be analyzed by an ellipsometer device.

According to the invention, the waves of the resultant beam are preferably transformed into very flattened elliptical or linear polarized waves, the orientation of which varies as a function of the optical path of the measurement beam.

According to the invention, the method comprises the step of utilizing a reference reflector exhibiting a reflection coefficient identical or close to that of the aforementioned zone of the part.

In a variant, it may comprise the step of equalizing or bringing together in value the intensity of the aforementioned beams which recombine.

The method according to the invention preferably comprises the step of preregulating said part by analysis of fringes, seeking the fringes of greatest contrast.

The method according to the invention may advantageously comprise the step of placing the aforementioned zone of the part in the range centered on the image of the reference reflector, for which range the optical paths of the reference beam and of the measurement beam are equal.

The subject of the present invention is also a device for the measurement of distance of a zone of a part, which is capable of being utilized to carry out the above method.

This device advantageously comprises means for emitting a light beam comprising two polarized waves, a separator plate placed in such a manner that the polarization of the incident beam is parallel or perpendicular to the plane of incidence of the beam on this plate, a reference reflector placed on the path of the reference beam, a quarter-wave plate placed in the path of the reference beam or of the measurement beam to rotate through 90° the plane of polarization of this beam, and means for analyzing the angular positions of the corresponding components of the conditions of polarization of said waves in the resultant beam.

The analyzing means comprise a quarter-wave plate placed in the path of the resultant beam to transform the polarization of this beam into a very flattened elliptical or linear polarization, and a polarizer.

The analyzing means may advantageously comprise an ellipsometer device.

The device according to the invention preferably comprises means for equalizing or bringing together in value the intensity of the aforementioned beams which recombine.

The device according to the invention preferably comprises analyzing means which comprise means for the photodetection of said waves and an image analysis and computation unit.

The subject of the present invention is also a method for positioning a part in relation to another part which is adjacent to it, which is capable of utilizing the aforementioned method or the aforementioned device.

This method advantageously comprises the steps of measuring the distance of three zones or points of a first part from the image plane of the reference reflector, displacing this part or the mirror to a regulating position in relation to this image plane, measuring the distance of three zones or points of a second part from the image plane of the reference reflector, displacing this part to a regulating position in relation to that of the first part or the mirror.

The above method preferably comprises the step of placing the zones of said part in one and the same plane situated in the aforementioned image plane of the reference reflector.

It may further comprise the step of displacing the reference reflector with a view to the relative regulations of position of said parts.

The present invention will be better understood on studying optical devices for distance measurement and their operation, which devices are diagrammatically illustrated in FIGS. 3, 5 and 6 of the accompanying drawing, by way of nonlimiting examples, FIG. 4 showing an example of particular application.

The optical device for distance measurement which is shown in FIG. 3 and referenced in a general manner by the reference 11 exhibits a structure corresponding to that of an interferometer of the MICHELSON type.

It comprises, in fact, a light-emitting source 12, preferably a mercury vapor arc or laser, which emits an incident beam 13 in the direction of a separator plate 14. This separator plate 14 divides this incident beam 13 on the one hand into a reference beam 15 which travels in the direction of a reference mirror 16 and on the other hand into a measurement beam 17 which travels in the direction of a reflective zone 18 of a part 19, of which it is desired to know the position along this beam 17. The reference beam 15 and the measurement beam 17 are respectively reflected by the mirror 16 and the zone 18 of the part 19 into a reference reflected beam 15a and a measurement reflected beam 17a which travel in the direction of the separator plate 15 and which recombine to form a resultant beam 20 which travels in the direction of an analyzer 21.

In the incident beam 13 there is provided a wave selector 22 for selecting particular wavelengths in the beam emitted by the source 12, then a polarizer 23 such that the monochromatic light wave of the incident beam 13 which reaches the separator plate 14 is polarized parallel to the plane of incidence of this plate 14. The polarizer 23 might however be such that the incident beam 13 is polarized perpendicularly to the separator plate 14.

In the reference beam 15 and its reflected beam 15a there is disposed a quarter-wave plate 24, the neutral line of which is placed at 45° in relation to the direction of polarization of the polarizer 23 placed in the incident beam 13. Thus, when the reference reflected beam 15a reaches the separator plate 14, it is polarized orthogonally to the measurement beam 17 or to the reflected measurement beam 17a.

The amplitude or the intensity of the reference reflected beam 15a and the measurement reflected beam 17a being dependent upon the reflection coefficients of the reference mirror 16 and of the zone 18 of the part 19 which may be identical or close, but which in general are not so, it is desirable to provide, on the reference beams 15 and 15a, switchable neutral filters 25 making these intensities equal or close.

The analyzing means 21, constituting an ellipsometer, which are disposed in the resultant beam 20, comprise a quarter-wave plate 26, the neutral lines of which are at 45° in relation to the incident plane and which permits the transformation of the polarization of this beam into a very flattened elliptical or linear polarization and a polarizer 27 which permits the measurement of the angular position of the principal component of the condition of polarization of the resultant beam 20 emerging from the quarter-wave plate 26, relative to a reference position.

The analyzing means 21 likewise comprise photodetection means 28, preferably a camera, associated with the polarizer 27 and connected to an image analysis and angle computation unit 29.

This polarizer 27 may operate by extinction or by phase measurement if it is rotating and may be replaced by any other angular measurement means known in polarimetry, in saccharimetry or elsewhere. The analyzing means 21 may advantageously be an ellipsometer.

Using the selector 22, which might be placed in the resultant beam 20, a light wave of a particular wavelength $\lambda$ is selected. There is obtained on the polarizer 27 a condition of polarization which exhibits a very flattened elliptical or linear polarization, the principal component of which is, in relation to a reference angular position, in a specified angular position.

If the part 19 is displaced along the direction of the measurement beam 17, this principal component rotates, the angular variation of this component being dependent upon the variation of position of the part 19, this rotation being of 180° for a displacement of $\lambda/2$.

If now two waves of differing wavelengths $\lambda 1$ and $\lambda 2$ are selected using the selector 22, simultaneously or in succession, there are then obtained by the polarizer 27 two angular positions with angle values $\alpha 1$ and $\alpha 2$ corresponding to the positions of the principal components of the conditions of polarization of these waves in the resultant beam 20.

When the part 19 is displaced along the measurement beam 17, these angles $\alpha 1$ and $\alpha 2$ vary differently. It is then possible to divide the displacement of the part 19 along the direction of the measurement beam 17 into adjacent ranges at the ends of each one of which the angular positions of the two principal components of the conditions of polarization of the waves of wavelengths $\lambda 1$ and $\lambda 2$ are identical or are superposed. Each one of the ranges p exhibits a length which is computed by applying the principle of excess fractions in the formula $$E(\lambda 1).\lambda 2/2 = E(\lambda 2).\lambda 1 = p$$

in which $E(\lambda 1)$ and $E(\lambda 2)$ are the integers corresponding to the wavelengths $\lambda 1$ and $\lambda 2$ exhibiting the same degree of accuracy with respect to these wavelengths.

When the zone 18 of the part 19 is placed in a position such that the optical paths of the reference beam 15 and of the measurement beam 17 are equal, this position corresponding to what will be referred to as the image of the reference mirror 16, the principal components of the conditions of polarization are, in the polarizer 27, identical or superposed.

As the zone 18 of the part 19 is disposed in one of the ranges situated on either side of the image plane of the mirror 16, it is possible to compute its distance d from this plane by applying the principle of excess fractions to the integers k1 and k2 of the optical path equations using the following formula:

$$\alpha 1.\lambda 1 + 2.k1.\pi.\lambda 1 = \alpha 2.\lambda 2 + 2.k2.\pi.\lambda 2 = 4.\pi.n.d$$

in which n is the refractive index of the measurement medium, or the following corrected formula:

$$C1 + \alpha 1.\lambda 1 + 2.k1.\pi.\lambda 1 = C2 + \alpha 2.\lambda 2 + 2.k2.\pi.\lambda 2 = 4.\pi.n.d$$

in which C1 and C2 are the optical path differences associated with the chromatic dispersion of the interferometer at the selected wavelengths $\lambda 1$ and $\lambda 2$, $\alpha 1$ and $\alpha 2$ being expressed in radians.

It is, in fact, desirable to undertake the analysis of the conditions of polarization of the waves of wavelengths $\lambda 1$ and $\lambda 2$ when the zone 18 of the part 19 is situated in the range centered on the image plane of the mirror 16, since it is there that the conditions of polarization are easiest to characterize.

In practice, in order to place the zone 18 of the part 19 in this range, it is possible to proceed, as known by analysis of fringes, this zone 18 of the part 19 being in this range when the bright and dark fringes show greatest contrast.

EXAMPLE

Figure 1:
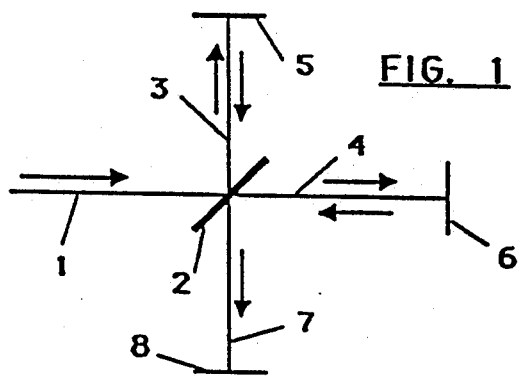
FIG. 1 depicts an interferometer.
Figure 2:
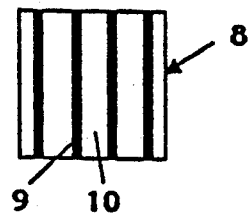
FIG. 2 depicts alternatively bright and dark interference fringes on an observation plane.

To bring the zone 18 of the part 19 into the two ranges referred to hereinabove, the selector 22 is employed to select a light of coherence length of approximately 100 $\mu$m, and the analysis of fringes is then undertaken as described hereinabove. Once the zone of maximum contrast has been reached, the following procedure is implemented.

To measure the distance between the actual position of the zone 18 of the part 19 with respect to the image plane of the mirror, corresponding to the equality of the optical paths of the reference beam 15 and the measurement beam 17, two wavelengths are for example selected, which are equal to 546.1 nm and 577 nm, by means of the selector 22 in the emission of a mercury arc.

In this case, $E(\lambda 1)$ is equal to 5461 and $(E\lambda 2)$ is equal to 5770 and the length p in particular of the range centered on the image plane of the reference mirror is, applying the aforementioned formula, equal to $546.1 \times 5770/2$ nm or $5461 \times 577/2$ nm, i.e. 1575498.5 nm. The range in which, by applying one of the aforementioned formulae, it is possible to compute with accuracy the position of the part in relation to the image of the mirror extends from (+)787749.25 nm to (−)787749.25 nm.

In the aforementioned formulae, the coefficients k1 and k2 are varied so as to give the equation $\alpha 1.\lambda 1 + 2.k1.\pi.\lambda 1 = \alpha 2.\lambda 2 + 2.k2.\pi.\lambda 2 = A = 4.\pi.n.d$ or the equation $C1 + \alpha 1.\lambda 1 + 2.kl.\pi.\lambda 1 = C2 + \alpha 2.\lambda 2 + 2.k2.\pi.\lambda 2 = B = 4.\pi.n.d$.

After this, having measured the angles $\alpha 1$ and $\alpha 2$, d is computed through the formula $d = A/4.\pi.n$ or the formula $d = B/4.\pi.n$.

These computations are performed by the computation unit 29.

If the same measurements are now repeated for three zones 18 of the part 19, it is possible to know the position of the latter in space in relation to the image plane of the mirror 16.

By repeating the same operations for three zones of a second part, it is naturally possible to infer therefrom the relative positions of the part 19 and of this other part. Knowing their relative positions, as between them or in relation to the aforementioned image plane of the mirror 16, it is possible, respectively, to regulate them in such a manner as for example to dispose their front face in the same plane, in particular in the image plane of the reference mirror 16.

In the course of these regulating operations, it is possible to displace the reference mirror 16 in such a manner as to displace its image along the direction of the measurement beam 17 in order to perform a relative regulation of the mirror 16 in relation to the first part installed, in order then to undertake the regulation of the second part.

The analyzing means may advantageously comprise an image analyzer coupled to an automatic computation unit, which analyzer and unit may moreover be connected to means for controlling the displacement of the mirror and/or of the first part, and/or of the second part.

Figure 4:
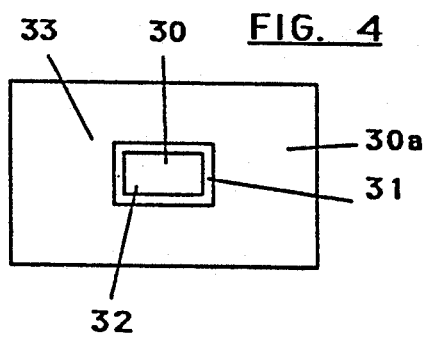
FIG. 4 is an illustration showing an example of a particular application of the methods described herein.

In a particular application shown in FIG. 4, the device described may be utilized for the accurate positioning of a chip 30 inserted in an orifice 31 of a substrate 30a. To this end, three reflective zones 32 will be chosen on the front face of the chip 30, these zones forming a triangle, and three reflective zones 33 will be chosen on the front face of the substrate 30a, these zones likewise forming a triangle. The positioning operations may be performed in such a manner that their front faces extend in one and the same plane.

Figure 3:
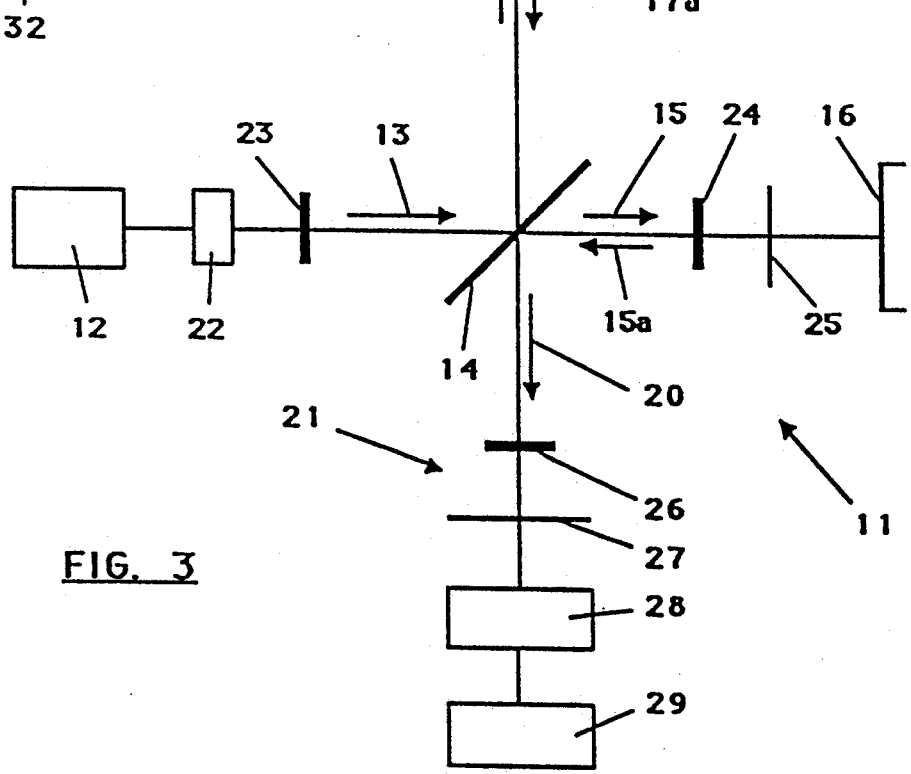
FIG. 3 depicts an optical device for distance measurement and its operation.

The optical device for distance measurement of FIG. 3 being more specifically designed to operate in a sequential manner, the two waves of wavelengths 1 and $\lambda 2$ being analyzed, in succession, a description will now be given, with reference to FIGS. 5 and 6, of two optical devices for distance measurement which are more specifically designed to operate in a simultaneous manner.

Figure 5:
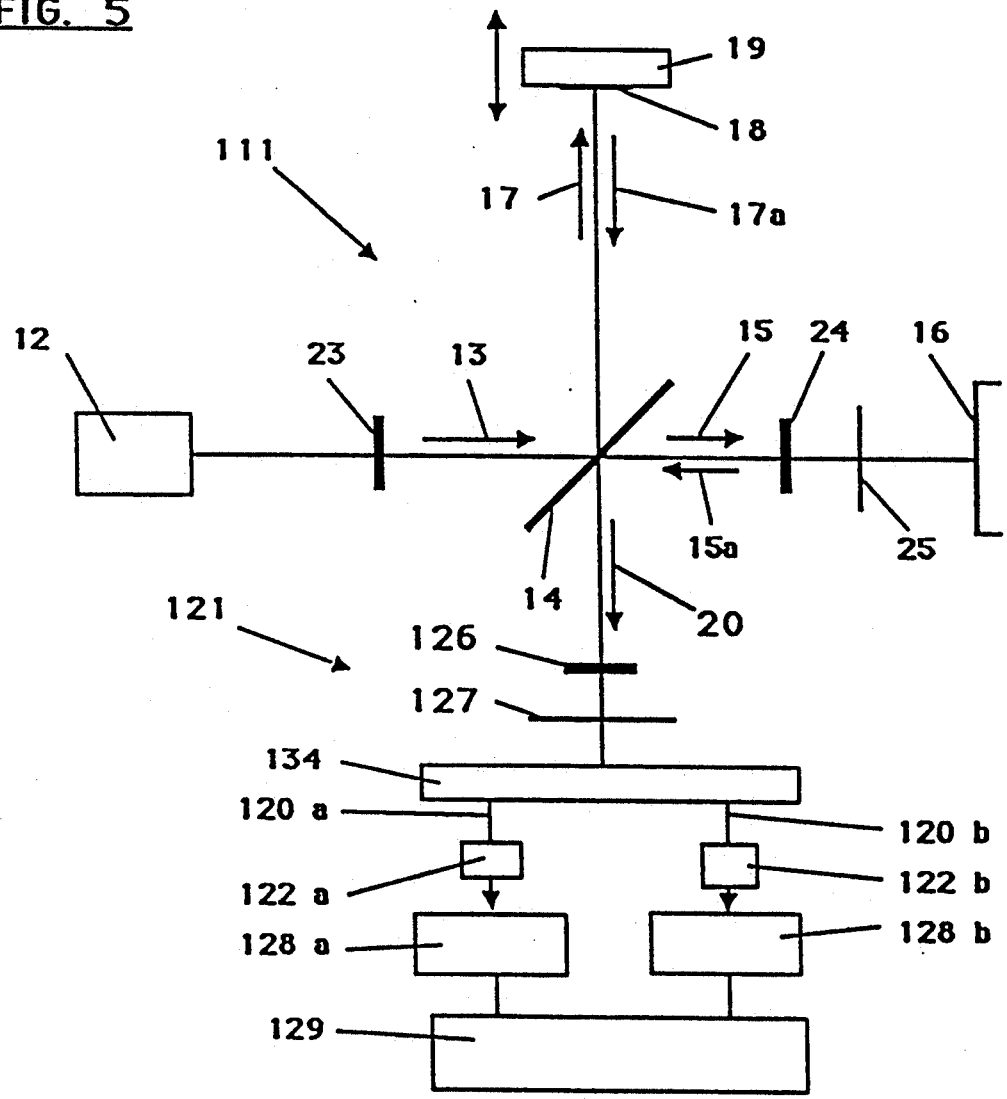
FIG. 5 is a diagrammatic illustration of an optical device for distance measurement and its operation.

Referring to FIG. 5, it can be seen that the optical device for distance measurement 111 differs from the device described with reference to FIG. 3 in that the selector 22 is dispensed with and in that its analyzing or ellipsometer means 121 comprise, in the resultant beam 20, a quarter-wave plate 126 and then a polarizer 127, followed by a separator 134 of the beam 20 into two analysis beams 120a and 120b, which are detected respectively by photodetection means 128a and 128b. In the beams 120a and 120b there are provided filters 122a and 122b which respectively select the waves of wavelengths $\lambda 1$ and $\lambda 2$. The photodetection means are connected to an image analysis and computation unit 129 applying the aforementioned formulae. This unit 129 may then perform the aforementioned computation on the basis of the two waves $\lambda 1$ and $\lambda 2$ which are received simultaneously.

Figure 6:
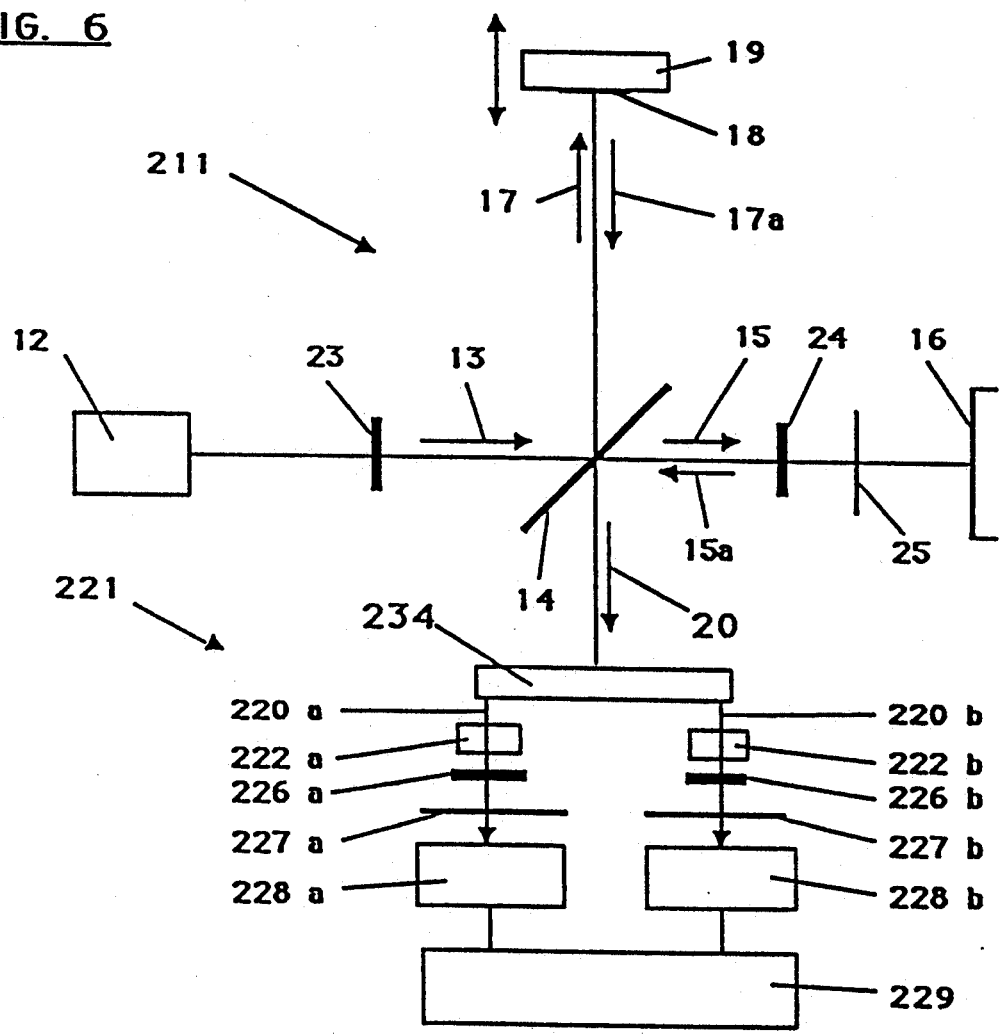
FIG. 6 is a diagrammatic illustration of an optical device for distance measurement and its operation.

This simultaneity may likewise be obtained by the mounting of the device 211 of FIG. 6, in which the analyzing or ellipsometer means 221 comprise a separator 234 separating the resultant beam 20 into two analysis beams 220a and 220b, in which there are respectively provided quarter-wave plates 226a and 226b, polarizers 227a and 227b and filters 222a and 222b to select the waves of wavelengths $\lambda 1$ and $\lambda 2$, these beams 220a and 220b then being detected by photodetection means 228a and 228b, which are connected to an image analysis and computation unit 229. The proposed analyzing means may comprise ellipsometer units with more rapid measurements.

We claim:

1. An optical method for distance measurement, which method comprises the steps of:

emitting an incident light beam comprising at least two waves of differing wavelengths ($\lambda 1$ and $\lambda 2$);

separating this beam into a reference beam and a measurement beam which are reflected on, respectively, a reference reflector and a zone of a part of which it is desired to measure the position in the direction of the measurement beam;

recombining the reflected reference beam and the reflected measurement beam into a resultant beam in which said waves exhibit conditions of polarization, the principal components of which rotate when the optical path of the aforementioned measurement beam varies and which determine, in the direction of the measurement beam, adjacent length ranges at the ends of each one of which the angular positions of two corresponding principal components of these conditions of polarization, relative to a predetermined angular position, are substantially identical;

determining, in the resultant beam, the angular positions ($\alpha 1$ and $\alpha 2$) of two corresponding principal components of said conditions of polarization of said waves;

and computing, as a function of said angular positions, the distance separating the aformentioned zone of said part from a reference position.

2. The method as claimed in claim 1, which method comprises the step of computing the aforementioned distance from the image of the reference reflector by applying the principle of excess fractions to the integers k1 and k2 of the optical path equations by the formula:

$$\alpha 1.\lambda 1 + 2.k1.\pi.\lambda 1 = \alpha 2.\lambda 2 + 2.k2.\pi.\lambda 2 = 4.\pi n.d$$

r the formula:

$$C1 + \alpha 1.\lambda 1 + 2.k1.\pi.\lambda 1 = C2 + \alpha 2.\lambda 2 + 2.k2.\pi.\lambda 2 = 4.\pi.n.d$$

in which n is the refractive index of the measurement medium, C1 and C2 are the optical path differences associated with the chromatic dispersion of the interferometer at the selected wavelengths $\lambda 1$ and $\lambda 2$, and $\alpha 1$ and $\alpha 2$ are in radians.

3. The method as claimed in any one of claims 1 or 2, which method comprises the step of emitting the two waves substantially simultaneously.

4. The method as claimed in any one of claims 1 or 2, which method comprises the step of emitting the two waves in succession.

5. The method as claimed in any one of claims 1 or 2, wherein the emitted beam is a polychromatic beam, preferably having an extended line spectrum, from which the aforementioned two waves are extracted.

6. The method as claimed in claim 5, wherein the aforementioned waves are selected in the aforementioned incident beams.

7. The method as claimed in claim 5, wherein the aforementioned waves are selected in the aforementioned resultant beam.

8. The method as claimed in any one of claims 1 or 2, which method comprises the step of polarizing the incident beam.

9. The method as claimed in any one of claims 1 or 2, which method comprises the step of polarizing the reference beam and the measurement beam orthogonally to one another.

10. The method as claimed in any one of claims 1 or 2, which method comprises the step of dividing the resultant beam into two analysis beams which respectively comprise the waves of wavelengths $\lambda 1$ and $\lambda 2$.

11. The method as claimed in any one of claims 1 or 2, wherein the aforementioned angular positions of the conditions of polarization of the aforementioned waves are analyzed by an ellipsometer device.

12. The method as claimed in any one of claims 1 or 2, wherein the waves of the resultant beam are transformed into substantially flattened elliptical or linear polarized waves, the orientation of which varies as a function of the optical path of the measurement beam.

13. The method as claimed in any one of claims 1 or 2, which method comprises the step of utilizing a reference reflector exhibiting a reflection coefficient substantially similar to that of the aforementioned zone of the part.

14. The method as claimed in any one of claims 1 or 2, which method comprises the step of substantially equalizing or bringing together in value the intensity of the aforementioned beams which recombine.

15. The method as claimed in any one of claims 1 or 2, which method comprises the step of preregulating said part by analysis of fringes.

16. The method as claimed in any one of claims 1 or 2, which method comprises the step of placing the aforementioned zone of the part in the range centered on the image of the reference reflector, for which range the optical paths of the reference beam and of the measurement beam are substantially equal.

17. A device for measuring the distance of a zone of a part, which device comprises a light emitter for emitting an incident light beam comprising two polarized waves, a separator plate placed in such a manner that the polarization of the two polarized waves of the incident light beam produces a measurement beam and a reference beam which are substantially parallel or substantially perpendicular to the plane of incidence of the incident light beam on this plate, a reference reflector placed in the path of the reference beam, a quarter-wave plate placed in the path of the reference beam or of the measurement beam to rotate through about 90° the plane of polarization of the reference beam or of the measurement beam, and an analyzer for analyzing the angular positions of the corresponding components of polarization of said waves in the resultant beam formed from the reference beam and the measurement beam, thereby measuring the distance of a zone of a part.

18. The measurement device as claimed in claim 17, wherein the analyzer comprise a quarter-wave plate placed in the path of the resultant beam to transform the polarization of this beam into a substantially flattened elliptical or linear polarization, and a polarizer.

19. The measuring device as claimed in claim 17, wherein the analyzer comprise an ellipsometer device.

20. The measuring device as claimed in any one of claims 17 to 19, which device comprises analyzing or ellipsometer means which comprise means for the photodetection of said waves and an image analysis and computation unit.

21. The measuring device as claimed in any one of claims 17 to 20, which device comprises means for substantially equalizing or bringing together in value the intensity of the aforementioned beams which recombine.

22. A method for positioning a part in relation to another part which is substantially adjacent to it, which positioning method comprises the steps of measuring the distance of three zones or points of a first part in relation to an image plane of a reference reflector, displacing this first part or the reference reflector to regulating position in relation to the image plane, measuring the distance of three zones or points of the second part in relation to the image plane of the reference reflector, and displacing this second part to a regulating position in relation to that of the first part or the reference reflector, thereby positioning the second part in relation to the first part.

23. The positioning method as claimed in claim 22, which method comprises the step of placing the zones of said parts in one and the same plane situated in the aforementioned image plane of the reference reflector.

24. The positioning method as claimed in any one of claims 22 and 23, which method comprises the step of displacing the reference reflector in the course of the positioning.

* * * * *

UNITED STATES PATENT AND TRADEMARK OFFICE
CERTIFICATE OF CORRECTION

PATENT NO.  : 5,285,252
DATED       : February 8, 1994
INVENTOR(S) : Aime Vareille, et al It is certified that error appears in the above-indentified patent and that said Letters Patent is hereby corrected as shown below:

Column 8, line 43, claim 2, please delete "r" and insert therefor --or --.

Signed and Sealed this

Fourteenth Day of June, 1994

*Attest:*

BRUCE LEHMAN

*Attesting Officer*    Commissioner of Patents and Trademarks